C. R. HOTCHKISS.
COMBINATION TRACTOR AND VEHICLE.
APPLICATION FILED FEB. 26, 1918.
1,278,658.
Patented Sept. 10, 1918.
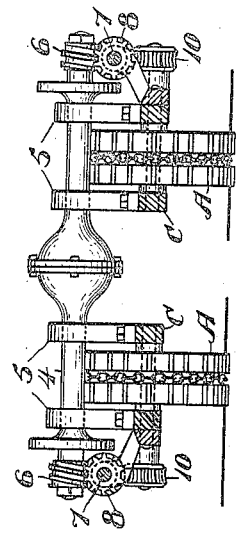
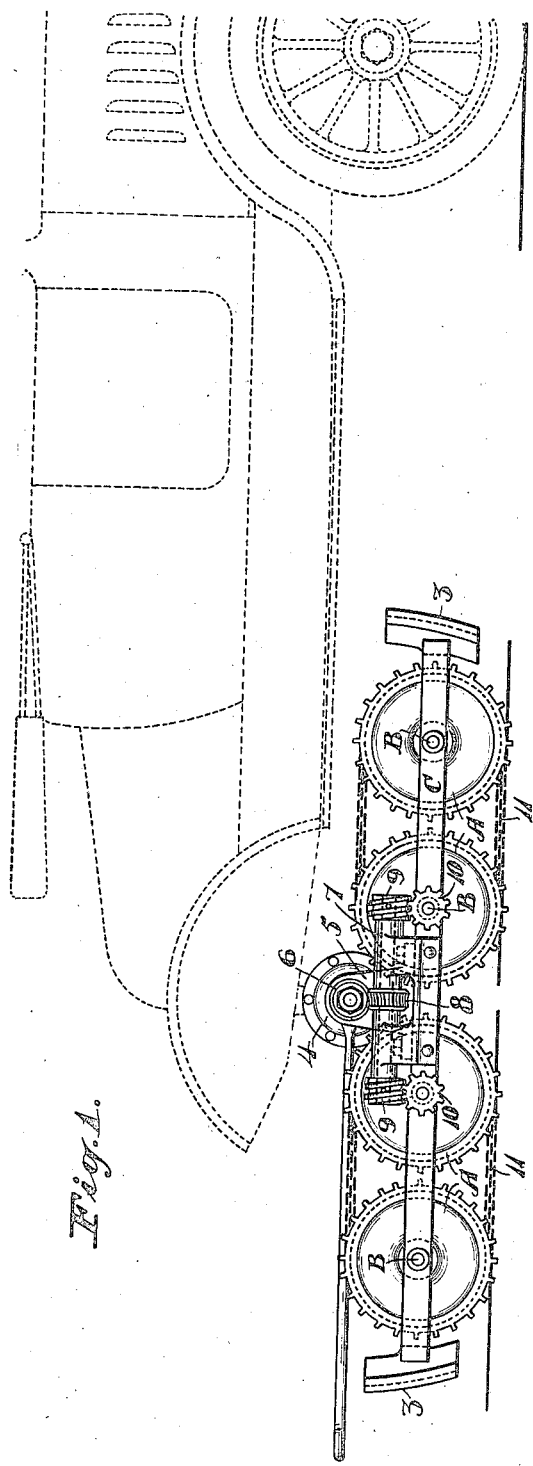
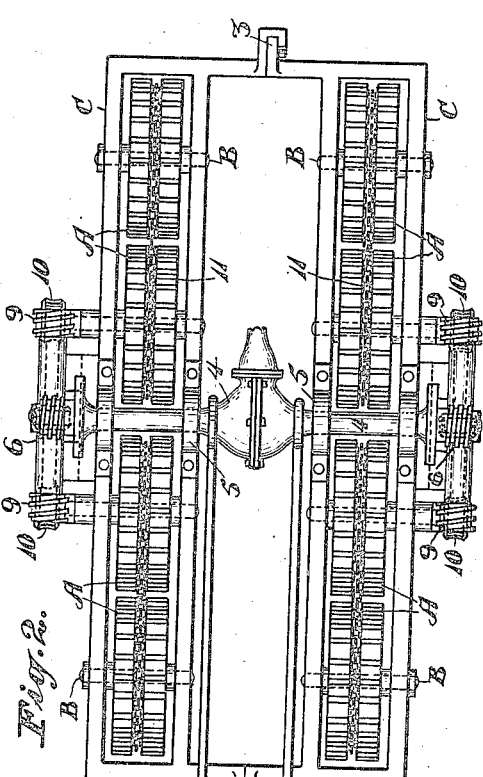
Inventor
C. R. Hotchkiss
By
Strong & Townsend
Attorneys

UNITED STATES PATENT OFFICE.

CHARLES R. HOTCHKISS, OF OAKLAND, CALIFORNIA.

COMBINATION TRACTOR AND VEHICLE.

1,278,658.  Specification of Letters Patent.  Patented Sept. 10, 1918.

Application filed February 26, 1918. Serial No. 219,304.

*To all whom it may concern:*

Be it known that I, CHARLES R. HOTCHKISS, a citizen of the United States, residing at Oakland, in the county of Alameda and State of California, have invented new and useful Improvements in Combination Tractors and Vehicles, of which the following is a specification.

This invention relates to the combination of an independent self-propelled vehicle and a tractor mechanism upon which the vehicle may be supported and with which it may be propulsively connected so that the combined mechanism may act as a unit of travel.

It consists in so mounting the vehicle that the propelling mechanism occupies such a position relative to the tractor that the two may be connected, means by which said connection may be effected, means to drive a plurality of alined tractor wheels in unison, and means by which the tractor frame may yield and accommodate itself to the varying surface over which the tractor wheels may pass, without change in the driving effort thereon.

It also comprises details of construction which will be more fully explained by reference to the accompanying drawings, in which—

Figure 1 is a side elevation of the tractor and the vehicle indicated in dotted lines.

Fig. 2 is a plan view of the tractor.

Fig. 3 is a transverse sectional view.

The tractor is here shown as consisting of a plurality of pairs of wheels A, of any suitable or usual construction, each pair being fixed to an axle B, the ends of which are journaled independently in members C of the tractor frame. This frame is made in two sections which meet at the ends midway of the length and have vertical guiding engaging arcs 3 which are capable of movement, so that the frame sections may tilt with relation to each other and about a common journal, as will be hereafter described.

The automobile frame, which in the present case illustrates the combination, is of greater width than the tractor frame to allow its rear portion to be supported upon the tractor frame with the rear differential axle 4 extending above the tractor frame midway of its length and supported in boxes 5 mounted on the tractor frame. The rear wheels of the automobile are removed and in their places are fitted driving gearing which, in the present case, consist of screw members 6 of a worm gear. The companion members are shafts 7 journaled parallel with the frame and having formed upon them the spiral worm gear 8. Power is transmitted to rotate this shaft from the differential shaft 4 and is transmitted through spiral worms 9 upon the shaft 7 to pinions 10 upon the shafts of the adjacent wheels A. These wheels may have any desired form of tractive surface, and I have shown them grooved centrally to receive chains 11. These chains are out of contact with the ground and serve to transmit power from the first wheels of a pair to the second following wheels in each series, thus insuring united tractive effort upon each pair of wheels.

Owing to inequalities of the surface traversed, or obstructions, the tractor wheels will lift independently and this is made possible by the journaling of the tractor frame upon the differential shaft and the arc-shaped connections 3 which unite the two frame members and may move about the said shaft as a center.

The front wheels of the automobile which rest upon the ground in front of the tractor members and may be turned by any usual or suitable steering gear to direct the apparatus, the differential gear of the vehicle member making this possible by reason of the variation of the driving power to either side of the tractor through the differential gear, while irregularities of the surface traveled over are compensated by the jointed and independent movements of the two tractor frame members.

Having thus described my invention, what I claim and desire to secure by Letters Patent is—

1. A tractor including a two-part frame, a plurality of pairs of wheels with axles journaled independently in each half of the frame, means to support a motor vehicle with its driving shaft and differential gear upon the frame, and a transmission mechanism connecting each end of the differential shaft with the shaft of the contiguous traction wheel.

2. A tractor including a two-part frame, a plurality of pairs of wheels with axles journaled independently in series in each half of the frame, means to support a motor vehicle with its driving shaft and differential gear upon the frame, transmission mechanism connecting each end of the differential shaft with the contiguous wheel of a successive connected series, and guiding means between the meeting ends of the frames to allow independent vertical movement of said frames.

3. In a tractor of the character described, a two-part frame with vertically movable joints and guides at each end, bearing wheels with axles journaled in line in each half of the frame and in series one behind another, means connecting each two of the successive series independently of the following series, means to support a motor vehicle with its driving means and differential shaft upon the frame intermediately of the two following series, transmission gearing between the ends of the differential shaft and the shafts of each following series, and journal boxes fixed to the two parts of the frame in which the differential shaft turns and about which vertical movements of the two-part frame may take place.

4. A tractor including a two-part frame with vertically movable joints and guides at each end, tractor wheels with axles journaled in line in each frame member and in series connected in pairs to turn in unison, an automobile with a motor and a driving shaft, a differential rear shaft journaled across the frame members, front steering wheels resting upon the ground in front of the tractor wheel frame, and transmission mechanism connecting the ends of the differential shaft with the traction wheels.

5. A tractor including a sectional frame, traction wheels borne by each section of the frame, means to support the rear end of a motor vehicle on said frame, means connecting the sections to permit same to move independently and vertically, and means to drive the traction wheels from the motor vehicle.

6. A tractor including a frame, means to support the rear end of a motor vehicle on said frame, traction wheels supporting the frame, a drive shaft on the frame extending longitudinally thereof, means to drive the shaft from the motor vehicle.

7. A tractor including a longitudinally divided frame, means to connect the ends of the frame division so as to allow same to tilt vertically independent of each other, means to support the rear of a motor vehicle on said frame, traction wheels for supporting the frame divisions, and means to drive the wheels from the vehicle.

8. A tractor including a frame, traction wheels on each side of the frame, means to support the rear end of a motor vehicle on said frame, a shaft on each side of the frame extending longitudinally thereof, means to drive the shafts from the motor vehicle, and means to drive the wheels from the adjacent portions of the shafts.

9. A tractor including a frame, means to support the rear end of a motor vehicle on said frame, a pair of wheels on each side of the frame, a shaft on each side of the frame, means on each shaft for actuating each of the pair of wheels, and means to drive the shafts from the motor vehicle.

10. In a tractor, a frame having sides and ends connecting the sides, traction wheels on each side of the frame, means to support the rear end of a motor vehicle on said frame at substantially the center thereof, means to drive the wheels from the motor vehicle, and means to allow the wheels on either side of the frame to have vertical movement independent of the wheels on the other side of the frame.

In testimony whereof I have hereunto set my hand in the presence of two subscribing witnesses.

CHARLES R. HOTCHKISS.

Witnesses:
  W. W. HEALEY,
  M. E. EWING.